United States Patent [19]
Johnson et al.

[11] 4,049,014
[45] Sept. 20, 1977

[54] POWER TRANSMISSION

[75] Inventors: Gary L. Johnson, Pontiac, Mich.; Walter J. Zoya, Rolling Hills Estates, Calif.

[73] Assignee: Sperry Rand Corporation, Troy, Mich.

[21] Appl. No.: 619,532

[22] Filed: Oct. 3, 1975

[51] Int. Cl.² .......................................... F16K 43/00
[52] U.S. Cl. ................................ 137/315; 137/494.6; 137/538; 137/543.23
[58] Field of Search ..................... 137/315, 454.6, 538, 137/543.23

[56] References Cited

U.S. PATENT DOCUMENTS

| | | | |
|---|---|---|---|
| 2,845,085 | 7/1958 | Robbins | 137/454.6 |
| 3,482,594 | 12/1969 | Simon | 137/538 |
| 3,640,304 | 2/1972 | Fox | 137/315 |
| 3,831,621 | 8/1974 | Anthony | 137/454.6 X |

Primary Examiner—Harold W. Weakley
Attorney, Agent, or Firm—Theodore Van Meter

[57] ABSTRACT

A cartridge type sleeve and plunger hydraulic valve is retained in a blind bore along with a biasing spring by a closure plug. Spaced transverse passages intersecting the bore are either separated or connected depending upon whether the plunger is either shifted by the spring bias or by fluid pressure overcoming the spring bias. An elastomeric seal eliminates leakage when the valve is in closed position. To insure against accidental fall out of any loose parts when the valve is disassembled under difficult working conditions, as in mines, O-rings are utilized as retainers for the spring and other parts.

3 Claims, 4 Drawing Figures

POWER TRANSMISSION

In modern semi-automated coal mining systems, extensive use is made of hydraulic power transmission to raise and lower and to laterally shift a large number of side-by-side roof supports. The conditions are such that not only are the valves required to be substantially leakproof when closed but also they must be readily reparable when malfunctions occur. The conditions under which repairs have to be made are extremely adverse to the maintenance of the degree of cleanliness required when repairing hydraulic system components. The atmosphere is dusty, the floor is frequently water soaked and muddy, and the working space is often extremely cramped. This makes it desirable that repairs or replacements may be quickly performed with a minimum possibility of dropping any loose parts and with a minimum of pieces to handle.

The object of the present invention is to provide an improved hydraulic valve that is capable of meeting these requirements.

This object is achieved by the provision of a cartridbe type sleeve valve comprising a body having at least two spaced passages, a stepped bore in the body connecting the passages, a replaceable cartridge mounted in the bore, a closure plug retaining the cartridge in the bore and a spring in the opposite end of the bore, the cartridge comprising a stationary outer sleeve having a lateral opening to one passage and an axial opening to the other passage, an elastomeric seal in the sleeve between the passages, a plunger slidable in the sleeve and having a first section positionable within the seal to block flow between the passages and a second section positionable within the seal to connect the passages, and a spring in the bore at the end opposite the closure plug biasing the plunger to closed position, the plunger being shiftable by pressure in the one passage from closed to open position against the spring bias.

IN THE DRAWING

Figure 1:
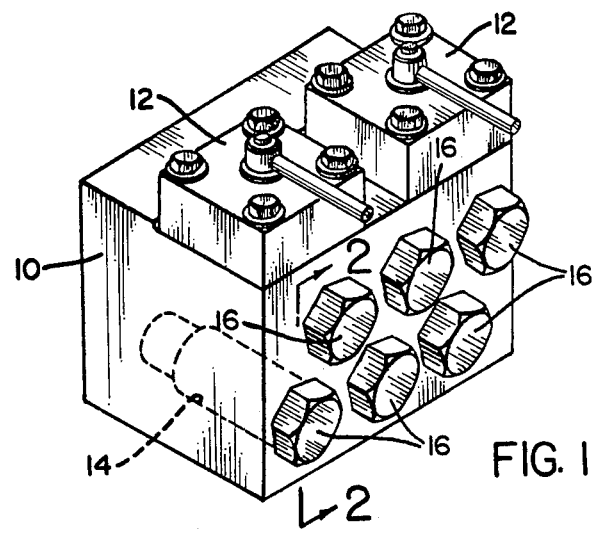
FIG. 1 is a perspective view of a typical mine roof support valve incorporating a preferred form of the present invention.
Figure 2:
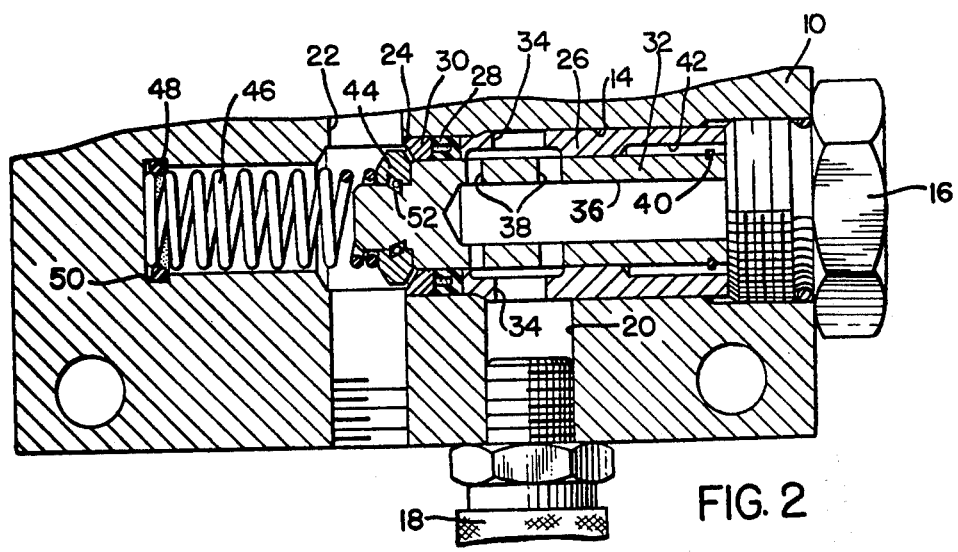
FIG. 2 is a cross section on line 2—2 of FIG. 1.

The valve of FIG. 1 comprises a main body 10 having attached thereto at its upper portion a pair of rotary pilot valves 12. The body 10 has a number of closed end bores of which one is illustrated at 14 and each of them is closed by a closure plug 16 threaded into the body. Suitable terminal and internal connections, not illustrated, are provided for each of the pilot valves and main valves in the body 10. One such terminal connection is illustrated at 18 in FIG. 2. This forms a connection to a transverse passage 20 which intersects the bore 14. Another transverse passage 22 intersects the bore 14 in spaced relation to the passage 20. Commonly, the passage 20 may be considered a pressure inlet passage and passage 22 an outlet to a hydraulic motor.

Positioned in the bore 14 between the plug 16 and a shoulder 24 is a cartridge comprising an outer sleeve 26, an elastomeric seal 28 and a ring 30 together with a plunger 32 slidable in the sleeve 26. The sleeve 26 has lateral passages 34 connecting with the passage 20. The plunger 32 has an internal blind bore 36 which has spaced radial passages 38 communicating with the passage 34. A snap ring 40 and an enlarged portion 42 of the bore of sleeve 26 limit the motion of plunger 32 to the left.

Figure 3:
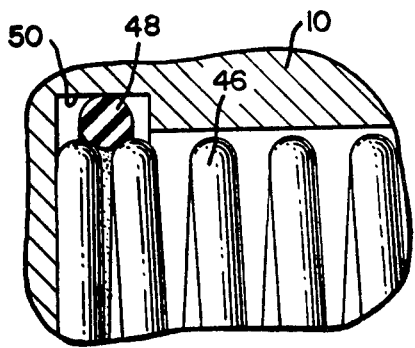
FIG. 3 is an enlarged fragmentary view of a portion of FIG. 2.

At its left end the plunger 32 carries a retainer ring 44 against which a spring 46 abuts. The opposite end of spring 46 abuts the end wall of the blind bore 14. The left end of spring 46 is retained in its position by means of an O-ring 48 positioned in a counterbore 50 which has a roughened surface and the spring 46 is partially threaded into the O-ring 48 during assembly so that the spring 46 will not fall out during disassembly. This feature is illustrated on a larger scale in FIG. 3.

Figure 4:
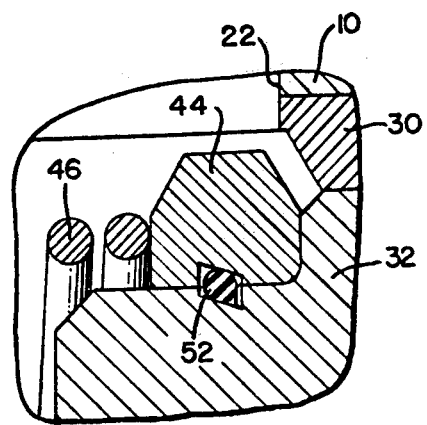
FIG. 4 is an enlarged fragmentary view of a portion of FIG. 2.

Likewise, the retainer ring 44 is retained on the plunger 32 by means of an O-ring 52 (see FIG. 4) which is retained in an annular groove; one half formed in the retainer 44 and the other half formed in the plunger 32. Each of these half grooves is deep at one side and shallow at the opposite side so that during assembly the ring 44 may be pushed over the O-ring 52 which is pressed into the deep part of its groove and is then allowed to snap back into normal shape when the groove halves are in register. Any force tending to move the retainer ring 44 to the left will, on the other hand, urge the O-ring into the shallow portions of each groove and prevent removal. When it is necessary to remove the retainer ring 44, it may be pressed off, which operation will destroy the O-ring 52.

The operation of the valve is such that when pressure fluid is admitted through connection 18 to passage 20, it flows to the interior of plunger 32, causing the latter to shift to the left against the bias of spring 46. As the first radial passage 38 passes into the elastomeric seal 28, fluid pressure pushes that seal radially outward so that there is no tendency to abraid or shave material off from the seal 28. In its final open position, the plunger 32 connects the passages 20 and 22 through the radial passages 38, thus allowing flow to the passage 22. When this flow terminates because the fluid motor which it feeds has reached the end of its stroke, pressure will equalize in passages 20 and 22, allowing the spring 46 to return the plunger 32 to its position illustrated. Fluid can be released from the fluid motor and the passage 22 by one of the other valves in block 10 which is similarly constructed except for having a separate pilot connection for urging the plunger to the left.

We claim:

1. A cartridge type sleeve valve comprising a body having at least two spaced passages, a stepped bore in the body connecting the passages, a replacable cartridge mounted in the bore, a closure plug retaining the cartridge in the bore and a spring in the opposite end of the bore, the cartridge comprising a stationary outer sleeve having a lateral opening to one passage and an axial opening to the other passage, an elastomeric seal in the sleeve between the passages, a plunger slidable in the sleeve and having a first section positionable within the seal to block flow between the passages and a second section positionable within the seal to connect the passages, and a spring in the bore at the end opposite the closure plug biasing the plunger to closed position, the plunger being shiftable by pressure in the one passage from closed to open position against the spring bias.

2. A valve as defined in claim 1 having at the bore end a counterbore having a roughened surface and an elastomeric O-ring in the counterbore partially threaded onto the end of the spring to retain the spring against dropping out when the cartridge is removed for repair or replacement.

3. A valve as defined in claim 1 having a retainer ring on the plunger, mating annular grooves in the ring and plunger, an elastomeric O-ring in the grooves, the grooves varying in depth oppositely in the axial direction whereby the ring may easily pass over the O-ring during assembly, but may not pass back over the O-ring without destroying it.

* * * * *